Aug. 26, 1947.  R. E. KLAGES ET AL  2,426,358
JOINT CONSTRUCTION
Filed May 21, 1945
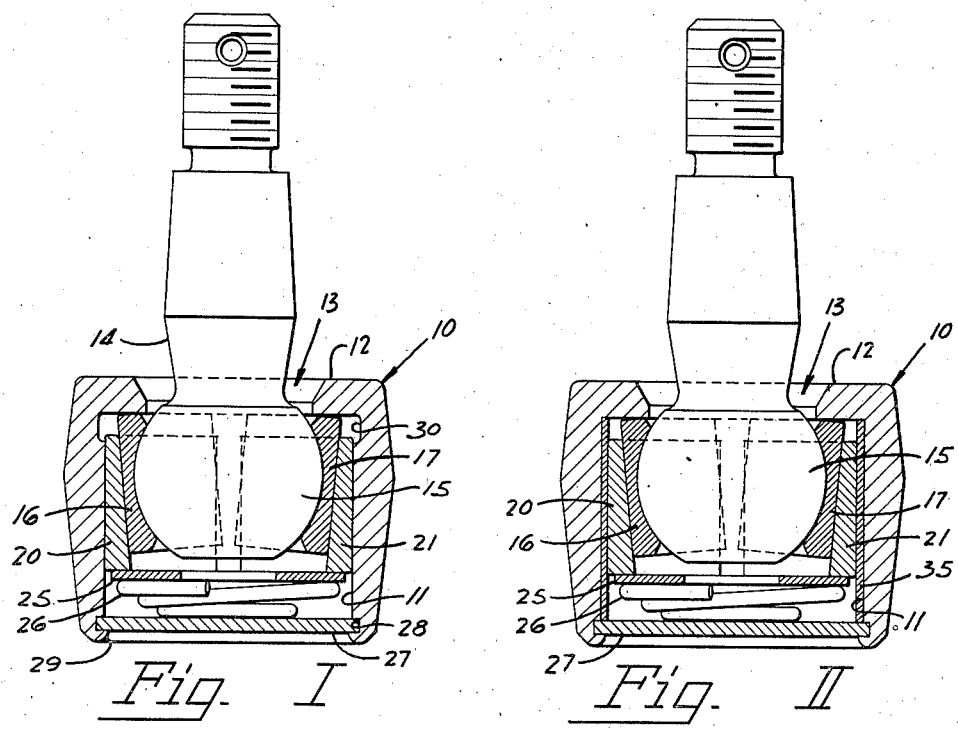
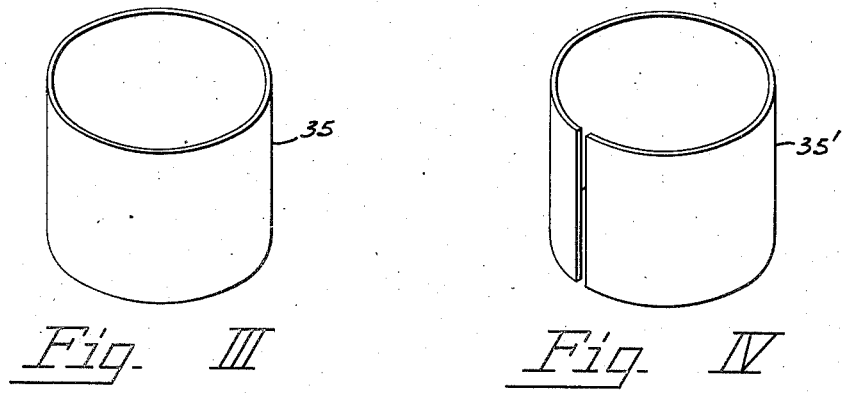
Reynold E. Klages
William A. Flumerfelt
INVENTORS
BY
Edmund B Whitcomb
ATTORNEY Patented Aug. 26, 1947

2,426,358

UNITED STATES PATENT OFFICE 2,426,358

JOINT CONSTRUCTION

Reynold E. Klages and William A. Flumerfelt, Columbus, Ohio, assignors to The Columbus Auto Parts Company, Columbus, Ohio, a corporation of Ohio Application May 21, 1945, Serial No. 594,890

5 Claims. (Cl. 287—87)

This invention relates to an improved ball and socket joint particularly adapted for use in steering connections for automobiles and has for an object thereof, the provision of an improved ball and socket joint which is automatically self adjusting to compensate for wear, in which the efficiency thereof and life of the joint is greatly enhanced. A feature of the invention is to provide an improved construction which maintains a proper axial relative adjustment of the center of the ball in the socket in use and in which the formation of shoulders or irregular or undue wear of the housing or parts is avoided and interference with the proper operation of the take-up means is eliminated.

Other objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure I is a sectional view showing one embodiment of our improved combination, while Figure II is a similar view of a modified embodiment thereof;

Figures III and IV are perspective views of types of liners which may be used in the embodiment of Figure II.

In the construction of the embodiment illustrated in Figure I, the housing 10 is provided with a cylindrical bore 11, one end of the housing 10 having an inturned flange 12 so that the housing has an opening 13 for receiving the shank 14 of the ball stud, which has a ball 15 positioned within the housing. The ball 15 is positioned substantially centrally within the opening 11 of the housing as shown and is surrounded or embraced by a pair of ball seats 16 and 17, which have inner bearing surfaces shaped to conform to that of the ball 15 and these ball seats 16 and 17, when inserted in the joint, are spaced from each other along their opposite edges as shown in the drawings. The outer surfaces of said ball seats 16 and 17 are substantially semi-cylindrical in shape as indicated, in order to receive correspondingly shaped wedges 20 and 21, which form the means for causing take-up for wear between the ball 15 and the ball seats. To this end, the wedges 20 and 21 also have cylindrical outer surfaces conforming to and fitting within the cylindrical bore or opening 11 in the housing 10. In the particular embodiments shown, it will be noted that the inner cylindrical surfaces of the wedges 20 and 21 have their axes inclined to the vertical, in this way forming the wedge configuration; and it is also evident that the ball seats 16 and 17 are arranged so that their cylindrical outer surfaces are inclined to conform thereto.

A washer 25 is located at the lower end of the wedges so that a coiled compressed spring 26 may bear against the same to normally urge the wedges upwardly in the construction shown. A disc 27 is fitted into a groove 28 at the lower end of the housing 10, and the lower rim of the housing may be turned over said disc, as indicated at 29, to form a satisfactory retaining means for the compressed spring 26.

An important feature of the present invention, as embodied in the illustration in Figure I, resides in the fact that the upper end of the bore 11 in the housing 10 is provided with an annular enlargement 30 extending downwardly from the inturned flange 12 a sufficient distance to overlap the upper edge of the wedges 20 and 21 when the ball joint is originally assembled so that at no time will the upper edge or rim of the wedges 20 and 21 come in contact with the wall 11.

In the construction of the embodiment illustrated in Figure II the housing 10 is provided with the cylindrical bore 11, as before, and the inturned flange 12 forming the opening 13 for receiving the shank of the ball stud with the ball 15 positioned within the housing. The pair of ball seats 16 and 17, which have bearing surfaces shaped to conform to that of the ball 15 and outer surfaces substantially semi-cylindrical in shape are used with the cooperating wedges 20 and 21 which have cylindrical outer surfaces conforming to and fitting within a cylindrical liner 35 hereinafter described and located within the opening 11 of the housing 10, formed and arranged as illustrated in Figure II. The spring 26 is also interposed between the washer 25 and the closing disc 27 as in the other embodiment.

In the embodiment of Figure II, instead of employing the annular recess 30 we insert in the inner wall of the housing 10 a liner 35 preferably hardened so that the upper rim of the wedges 20 and 21 can not form a shoulder on the wall 11 to prevent the spring 26 from properly moving the wedges and taking up for wear. In Figure III, for example we have illustrated a cylinder 35 forming the liner, whereas in Figure IV a split ring 35' to expand into position is shown to be used in the embodiment illustrated in Figure II. Other types of liners may be employed and suitable tight fit, in any instance, is secured between the liner 35 or 35' and the bore 11 of the housing 10.

It will thus be seen that with our invention, in use, which subjects the wedges 20 and 21 to movement within the housing 10, the upper edge or rim thereof can not gouge the material of the inner wall of the housing 11 to form rough surfaces or shoulders, which would otherwise prevent an efficient, proper, or long-lived and successful operation of the construction. Moreover, in the embodiments shown, the take-up for wear caused by the expansion of the spring 26 in turn moving the wedges 20 and 21 upwardly continuously, forces the ball seats 16 and 17 radially into tight and satisfactory contact with the surface of the ball 15 without displacing the center thereof with respect to the housing 10.

With our invention regardless of severe strains in use, tending to cause pounding between the internal bore of the socket and the wedge, we have discovered in the arrangement disclosed herein, means for preventing this action from interfering with the automatic take-up and that by our construction the seats and wedges will remain tight against the surface of the ball on the one hand, and the internal bore of the socket, on the other hand.

It is apparent that, within the scope of the invention, modifications and different arrangements may be made other than is herein disclosed, and the present disclosure is illustrative merely, the invention comprehending all variations thereof.

What we claim is:

1. In combination, a housing; a ball of a ball stud located inside said housing; ball seats around said ball; wedging means contacting said seats, and located within said housing; means for moving said wedging means to cause said seats to take up around said ball upon wear; and means to prevent shoulder formations from being produced between said wedging means and said housing during use of said joint.

2. In combination, a housing; a ball of a ball stud located inside said housing; ball seats around said ball; wedging means contacting said seats, and located within said housing; means for moving said wedging means to cause said seats to take up around said ball upon wear; and lining means between said wedging means and said housing to prevent wear between said housing and wedging means.

3. In combination, a housing having a cylindrical inner wall; a ball of a ball stud inside said housing; ball seats around said ball; wedges surrounding said seats, said wedges having cylindrical outer surfaces fitting the cylindrical wall in said housing; spring means for moving said wedges along the axis of said cylindrical housing to compensate for wear between said ball and ball seats; and a cutaway portion at the end of the inner wall of said housing adjacent the end of said wedges to prevent shoulder formation due to the action of said wedges on said inner wall of said housing.

4. In a ball and socket joint, a housing having a main cylindrical inner wall and an enlargement located at an end of said housing and connected with said main inner wall; a ball of a ball stud located inside said housing; ball seat and take-up members interposed between said cylindrical wall and said ball, an end of a take-up member extending beyond said cylindrical wall and into said enlargement of said housing; spring means acting on said members to take up for wear between the co-acting elements of said joint, said housing enlargement preventing shoulder formations due to movement of the co-acting elements relative to the inner cylindrical wall of said housing during the operation of said joint in use.

5. In combination, a housing, a ball of a ball stud located inside said housing; ball seats around said ball; wedging means contacting said seats, and located within said housing; means for moving said wedging means relative to the inner wall of said housing in the direction of the longitudinal axis of the joint to take up for wear, said wedging means having hardened surfaces and said wedging means and said housing being constructed with the terminating inner wall of said housing located a greater distance from said longitudinal axis than the outer moving edge portions of said wedging means thereby forming means to prevent shoulder formations from being produced between said wedging means and said housing during use of said joint.

R. E. KLAGES.
WILLIAM A. FLUMERFELT.

REFERENCES CITED

The following references are of record in the file of this patent:

UNITED STATES PATENTS

| Number | Name | Date |
|---|---|---|
| 1,951,197 | Milligan | Mar. 13, 1934 |
| 1,799,141 | Hufferd et al. | Mar. 31, 1931 |